United States Patent
Frey et al.

(10) Patent No.: US 9,156,365 B2
(45) Date of Patent: Oct. 13, 2015

(54) DEVICE AND METHOD FOR CONTROLLED EXCHANGE OF ENERGY BETWEEN AN ELECTRICAL POWER NETWORK AND A LOAD

(75) Inventors: Thomas Frey, Ebersberg (DE); Markus A. Stulle, München (DE)

(73) Assignee: IFS Informationstechnik GmbH, Munich (DE)

( * ) Notice: Subject to any disclaimer, the term of this patent is extended or adjusted under 35 U.S.C. 154(b) by 391 days.

(21) Appl. No.: 13/637,473

(22) PCT Filed: Feb. 22, 2011

(86) PCT No.: PCT/EP2011/000841
§ 371 (c)(1),
(2), (4) Date: Sep. 26, 2012

(87) PCT Pub. No.: WO2011/124298
PCT Pub. Date: Oct. 13, 2011

(65) Prior Publication Data
US 2013/0015809 A1     Jan. 17, 2013

(30) Foreign Application Priority Data

Mar. 29, 2010 (EP) .................................... 10003361
Apr. 21, 2010 (EP) .................................... 10004252
Oct. 18, 2010 (EP) .................................... 10013728

(51) Int. Cl.
*H02J 7/00*       (2006.01)
*B60L 11/18*      (2006.01)

(52) U.S. Cl.
CPC ......... *B60L 11/1824* (2013.01); *B60L 2270/34* (2013.01); *Y02T 10/7005* (2013.01); *Y02T 90/12* (2013.01); *Y02T 90/121* (2013.01); *Y02T 90/14* (2013.01)

(58) Field of Classification Search
CPC ........................................................ H02J 7/00
USPC ........................... 320/106, 104, 108; 307/104
See application file for complete search history.

(56) References Cited

U.S. PATENT DOCUMENTS 5,049,802 A       9/1991 Mintus et al.
2008/0281663 A1  11/2008 Hakim et al.
(Continued)

FOREIGN PATENT DOCUMENTS

DE     20 2005 012949   1/2007
EP         2017582       1/2009
(Continued)

*Primary Examiner* — Mohammed Alam
(74) *Attorney, Agent, or Firm* — RatnerPrestia

(57) ABSTRACT

A device for controlling the exchange of energy between an electrical power network and a load includes a stationary charging station for establishing an energy connection between the electrical power network and a supply point. The charging station has an LS controller for sending and receiving control signals via a signal transmission path, and includes a SIM station installed on the load side having a SIM controller. The SIM controller sends a SIM identifier of the SIM station to the LS controller via a signal transmission path at time intervals, wherein the LS controller adds an amount of energy exchanged between the electrical power network and the load to an energy amount counter associated with the SIM identifier. The amount of energy exchanged between the electrical power network and the load via the energy connection in a time interval is below a specified measurement resolution of the energy amount counter.

11 Claims, 9 Drawing Sheets

(56) References Cited

U.S. PATENT DOCUMENTS

| | | | |
|---|---|---|---|
| 2010/0041333 A1* | 2/2010 | Ungari et al. | 455/41.2 |
| 2011/0078092 A1* | 3/2011 | Kim et al. | 705/412 |
| 2011/0115429 A1* | 5/2011 | Toivola et al. | 320/108 |
| 2011/0258093 A1* | 10/2011 | Antoci | 705/34 |
| 2011/0263294 A1* | 10/2011 | Kim et al. | 455/558 |

FOREIGN PATENT DOCUMENTS

| | | |
|---|---|---|
| GB | 2438979 | 12/2007 |
| WO | WO 00/19580 | 4/2000 |

\* cited by examiner

DEVICE AND METHOD FOR CONTROLLED EXCHANGE OF ENERGY BETWEEN AN ELECTRICAL POWER NETWORK AND A LOAD

FIELD OF THE INVENTION

The invention concerns a device and a method for exchanging energy in a controlled manner between an electrical power network and a load.

In line with the progressive development of electromobility, there is a growing need for suitable devices which enable a controlled energy exchange between a generator and an energy load. This is particularly the case for devices for charging rechargeable batteries.

A protection system for a solar panel is known from WO 2000/019580 for the protection of the solar panel against theft or against unauthorised use. The solar panel can be used as a charging device for a rechargeable battery. The protection system of the solar panel comprises an override control on the solar panel side and a release control on the load side. For protection against unauthorised use of the solar panel, the override control on the solar panel side sends a first signal to the release control on the load side via the power lines and cuts off the energy transfer of the energy produced by the solar panel to the load via the power lines; this happens if the override control on the solar module side does not receive a second signal from the release control on the load side via the power lines within a set time period. The release control on the load side can comprise a chip card reader. In this way, an amount of money corresponding to the energy amount taken can be immediately charged to the chip card reader of a user.

BACKGROUND

An important application in the field of electromobility is the use of battery-charging devices for electric vehicles.

In the charging process of electric vehicles, various parameters must be adjusted by the charging station in order to be able to charge the vehicle battery with a specific energy quantity in a set time period. These parameters are, in particular, charging voltage and charging rate. It is a fundamental fact that these parameters are regulated by a control unit on the vehicle side. For this, a radio unit on the vehicle side is known from U.S. Pat. No. 5,049,802, which sends information about the current charging status of the vehicle battery to the charging station.

The charging of the energy quantity is determined by a meter during the charging process of electric vehicles. This meter is an integrating measuring device with a counter for measuring the electrical work or the electrical energy quantity. Equivalent terms for this are electricity meter, energy meter, energy quantity meter or usage meter.

A meter equipped with a GSM module is known from DE 20 2005 012 949 U1, in order to be able to transmit the meter reading from the meter to a control centre.

Electrical sockets equipped with cash-free advanced payment systems are known from EP 2017582 A1. Among other things, it is recommended that parking meters be equipped with said electrical sockets, so that the battery of an electric vehicle can be charged while parking via the electrical socket installed in the parking meter.

A system for the allocation of energy quantities between individual loads is described in US 2008/0281663 A1. The allocation of the energy quantities is carried out with the goal of preventing peak loads in the electrical power network. Electric vehicles can also be included in the system, wherein the electric vehicle user has the option of adjusting the energy exchange with a mobile device in terms of the set parameters.

In the charging process of electric vehicles, there is, however, an additional problem in that a charging process is not protected from misuse once it has been started. As soon as the electric vehicle is unsupervised, the charging cable can be removed by an unauthorised person and used for a different electric vehicle.

A charge column for electric vehicles is known from GB 2438979, wherein the charging process is started by user identification and wherein the charging cable is mechanically locked in the charge column during the charging process. Such a charge column is therefore mechanically protected from misuse. The disadvantage of such a charge column is once again that proportionally high costs have to be paid for the construction of a comprehensive network of correspondingly arranged charge columns.

SUMMARY

The object of the present invention is therefore to enable a flexible and simultaneously secure charging process for rechargeable batteries.

The object is foreseen to be solved by a device for exchanging energy in a controlled manner between an electrical power network (also referred to as main power grid) and a load, with a stationary charging station for establishing an energy connection between the electrical power network and a delivery point, wherein the charging station comprises a charging station controller for the sending and receiving of control signals via a signal transmission path, and with a SIM station installed on the load side for establishing an energy connection between the load and the aforementioned delivery point, wherein the SIM station comprises a SIM controller for the sending and receiving of control signals via the signal transmission path.

The solution according to the invention is characterised in that the SIM controller sends, at set time periods (which means in set temporal intervals), a SIM identifier assigned to the SIM station to the charging station controller via a signal transmission path, in that the charging station controller, on receiving a SIM identifier, adds an energy quantity exchanged or to be exchanged between the electrical power network and the load via the energy connection to the energy quantity meter assigned to the SIM identifier, and in that the time intervals are set in such a way that the energy quantity exchanged or to be exchanged between the electrical power network and the load via the energy connection within a time interval lies below a predefined resolution of the energy quantity meter.

The invention is based on the knowledge that a SIM identifier is continuously transmitted to the stationary charging station during the energy exchange process on the part of the load. SIM is a known abbreviation from the field mobile radio communication and stands for Subscriber Identification Module. In this context, SIM stands for every imaginable module which is able to generate a unique, system-wide SIM identifier. Other terms for SIM identifier are identification signal or Subscriber Identity Number, abbreviated to SIN. A module which can fulfil the aforementioned requirements is, for example, a chip card. The module can, however, also comprise a fingerprint scanner.

The stationary charging station is, in this context, every type of supply terminal wherein the electrical energy of an electrical power network is transferred to a load or vice versa, wherein electrical energy of a load is supplied to the electrical power network. The stationary charging station can, for example, be connected to the normal domestic connection on the electrical power network side, which is provided by an energy supply company for a homeowner.

In this context, the load is every type of operation material which requires electrical energy or gives off electrical energy to fulfil a human-set task.

In this context, the delivery point is every standardised interface between the charging station and the load.

In this context, the SIM identifier is every system-wide unique identifier which identifies the load and/or the respective SIM station against other components within the system. The SIM identifier can thereby remain unchanged in terms of time, as in a GSM network. However, it is also possible for the SIM identifier to change over time. It is crucial for the SIM identifier that other components can identify the relevant load and/or the relevant SIM station due to the SIM identifier and then assign a corresponding energy quantity meter.

Overall, the invention can be used for the temporally limited energy supply of a plurality of loads via a public delivery point provided for this purpose.

The device according to the invention can preferably be used as a charging device for rechargeable battery at delivery points provided for this purpose. These batteries can, for example, be electric vehicle batteries or batteries for portable electronic devices. The delivery point is, for example, a standard 220V electrical socket, to which a charging cable can be attached on the load side for establishing an energy connection to the battery.

Moreover, while using a charging cable, the signal transmission path can be coupled with the charging cable in the area of the electrical socket. The coupling can be based on power line communication bus technology (PLC BUS). The PLC BUS uses the alternating current voltage of the electrical power network as a carrier signal for the control data which are to be transmitted. The charging cable can thereby be used for both bidirectional energy transfer and bidirectional control signal transmission. The advantage of the coupling is that, among other things, by monitoring the signal transmission path, it can be recognised when the charging cable has been removed from the electrical socket. By monitoring the signal transmission path, the functionality of the energy connection in the area of the electrical socket can also be monitored.

The invention enables a particularly flexible and secure charging process for rechargeable batteries in electric vehicles. The energy quantity determined by the charging rate is recorded by an energy quantity meter, which is selected according to the SIM identifier of the electric vehicle. As soon as the charging cable has been separated from the electric vehicle, the respective energy quantity meter is also stopped. If the charging cable is connected to a different electric vehicle, a different energy quantity meter is selected and started depending on the SIM identifier. Misuse during an unauthorised charging process is therefore impossible.

Standard 220V systems can be upgraded cheaply with this invention. It is not unforeseeable, for example, that corresponding electrical sockets can be made available for electric vehicles in private or public car parks. The use is effected by simply connecting the charging cable to the electrical socket. At this point, the energy quantity meter of the corresponding electric vehicle is started based on the SIM identifier and charged according to the drawn amount of energy. The overall identification and charge calculation process can be carried out in the same manner as in GSM networks and with the same level of security.

The invention also enables a reversal of the charging process. For this, the electrical power network operator uses up the charging capacity of the vehicle battery. This is possible because every vehicle battery connected to the network is registered and can therefore be controlled. The sum of all registered vehicle batteries in the network can be used as a large energy store by the network operator, in order to balance peak loads without too much expense. As soon as this energy has been removed from the vehicle battery, this leads to positive monetary gains for the consumers, for example in the form of reimbursements or discounts. If, however, energy is supplied, this leads to monetary losses for the consumers, for example in the form of account debiting.

For establishing the energy connection between the electrical power network and the delivery point, the stationary charging station comprises rectifiers and/or AC converters, the application of which is familiar to the person skilled in the art. Similarly, corresponding rectifiers and/or AC converters can be provided in the SIM station installed on the battery side for establishing the energy connection between the battery and the delivery point. If energy is drawn from the electrical power network, a power supply with a rectifier is necessary, in order to supply the battery with this energy. Conversely, if energy is drawn from the battery, an AC converter with a mains adapter is necessary, in order to supply the electrical power network with this energy.

The object of the present invention is achieved accordingly by a method for exchanging energy between an electrical power network and a load, wherein an energy connection between the electrical power network and a delivery point is established via a stationary charging station, wherein the charging station comprises a charging station controller for the sending and receiving of control signals via a signal transmission path, and wherein an energy connection between the load and the aforementioned delivery point is established via a SIM station installed on the load side, whereby the SIM station comprises a SIM controller for the sending and receiving of control signals via the signal transmission path.

The solution of the object according to the invention is characterised in that the SIM controller sends, at set time intervals, a SIM identifier assigned to the SIM station to the charging station controller via the signal transmission path, in that the charging station controller, after a SIM identifier has been received, adds an energy quantity exchanged or to be exchanged between the electrical power network and the load via the energy connection to an energy quantity meter assigned to the SIM identifier, and in that the time intervals are set in such a way that the energy quantity exchanged or to be exchanged between the electrical power network and the load via the energy connection within a time interval lies below a predefined resolution of the energy quantity meter.

The two components of the invention which are essential to the invention are the SIM station and the stationary charging station.

The SIM station is a component of the device according to the invention for exchanging energy in a controlled manner between an electrical power network and a load, wherein the SIM station is suitable for establishing an energy connection between the load and a delivery point on the electrical power network side and comprises a SIM controller for the sending and receiving of control signals via a signal transmission path.

The solution according to the invention for the SIM station is characterised in that the SIM controller sends, at set time intervals, a SIM identifier assigned to the SIM station via the signal transmission path to control an energy quantity meter assigned to the SIM identifier, and in that the time intervals are set in such a way that the energy quantity exchanged or to be exchanged between the electrical power network and the load via the energy connection within a time interval lies below a predefined resolution of the energy quantity meter.

The stationary charging station is a component of the device according to the invention for exchanging energy in a controlled manner between an electrical power network and a load, wherein the stationary charging station is suitable for establishing an energy connection between the electrical power network and a delivery point on the load side and comprises a charging station controller for the sending and receiving of control signals via a signal transmission path.

The solution according to the invention for the stationary charging station is characterised in that the control signals received via the signal transmission path comprise a SIM identifier, which is assigned to the load and which is comprised in the control signals at set time intervals, in that the charging station controller, after a SIM identifier has been received, adds an energy quantity exchanged or to be exchanged between the electrical power network and the load via the energy connection to an energy quantity meter assigned to the SIM identifier, and in that the time intervals are set in such a way that the energy quantity exchanged or to be exchanged between the electrical power network and the load via the energy connection within a time interval lies below a predefined resolution of the energy quantity meter.

According to a preferred embodiment, the charging station comprises a charging station measuring unit for measuring the energy quantity, which is exchanged via the energy connection passing through the charging station. The charging station measuring unit is an integrating measuring device with a counter for measuring the electrical work or the energy quantity. The measured energy quantity in the time interval between receiving two SIM identifiers can be used by the charging station controller to, according to the invention, add the energy quantity provided within that time interval to the energy quantity meter which is assigned to the SIM identifier.

Accordingly, it is also possible for the required energy quantity measurements to be provided by the SIM station. In this case, the SIM station comprises a SIM measuring unit for measuring the energy quantity, which is exchanged via the energy connection passing through the SIM station. The SIM measuring unit is also an Integrating measuring device with a counter for measuring the electrical work or the energy quantity. The energy quantity measured in the time interval between sending two SIM identifiers can be sent as a measurement from the SIM station to the charging station. It is sent in line with the control signals sent from the SIM station to the charging station.

A combination of both embodiments is also possible. In this case, a charging station measuring unit is situated in the charging station and a SIM measuring unit is in the SIM station. When, for example during the battery-charging process, energy is transferred from the electrical power network to the battery, the charging station controller possesses on one hand a measurement on the side of the charging station measuring unit corresponding to the overall energy quantity provided, and on the other hand a measurement on the side of the SIM measuring unit corresponding to the actual consumed energy quantity. Additional security can be made possible in this way.

This additional security can be achieved according to an additional preferred embodiment, in that the charging station comprises a controllable circuit breaker which is inserted between the electrical power network and the delivery point.

The battery charging process is once again to be considered as an example. If, during this process, the measurements recorded by the charging station measuring unit exceed, compared to those recorded by the SIM measuring unit and sent by the SIM controller, a predefined deviation limit, the charging station controller separates the energy connection between the electrical power network and the delivery point by controlling the circuit breaker. Conversely, the additional security enables a plurality of authorised loads, each of which has a SIM identifier assigned to it, to be connected simultaneously to a charging station.

If, for example, the delivery point is a single electrical socket, a plurality of loads can be connected to this socket using a standard socket distributor. If an unauthorised consumer connects a load to the socket distributor without inserting a SIM station, the charging station controller cannot receive a valid energy quantity measurement from this load. Consequently, the charging station records a deviation in the energy quantity balance and cuts off the power supply to all connected loads by operating the circuit breaker. The charging station controller hereafter repeatedly checks whether the energy balance has been further breached (e.g. by using low-energy test currents). Only when the energy quantity balance has been rebalanced is the circuit breaker once again shut by the charging station controller for the transfer of large energy quantities.

BRIEF DESCRIPTION OF THE DRAWINGS

Additional details and advantages of the invention are illustrated using the following diagrams. The following are shown.

DETAILED DESCRIPTION OF THE INVENTION

Figure 1:
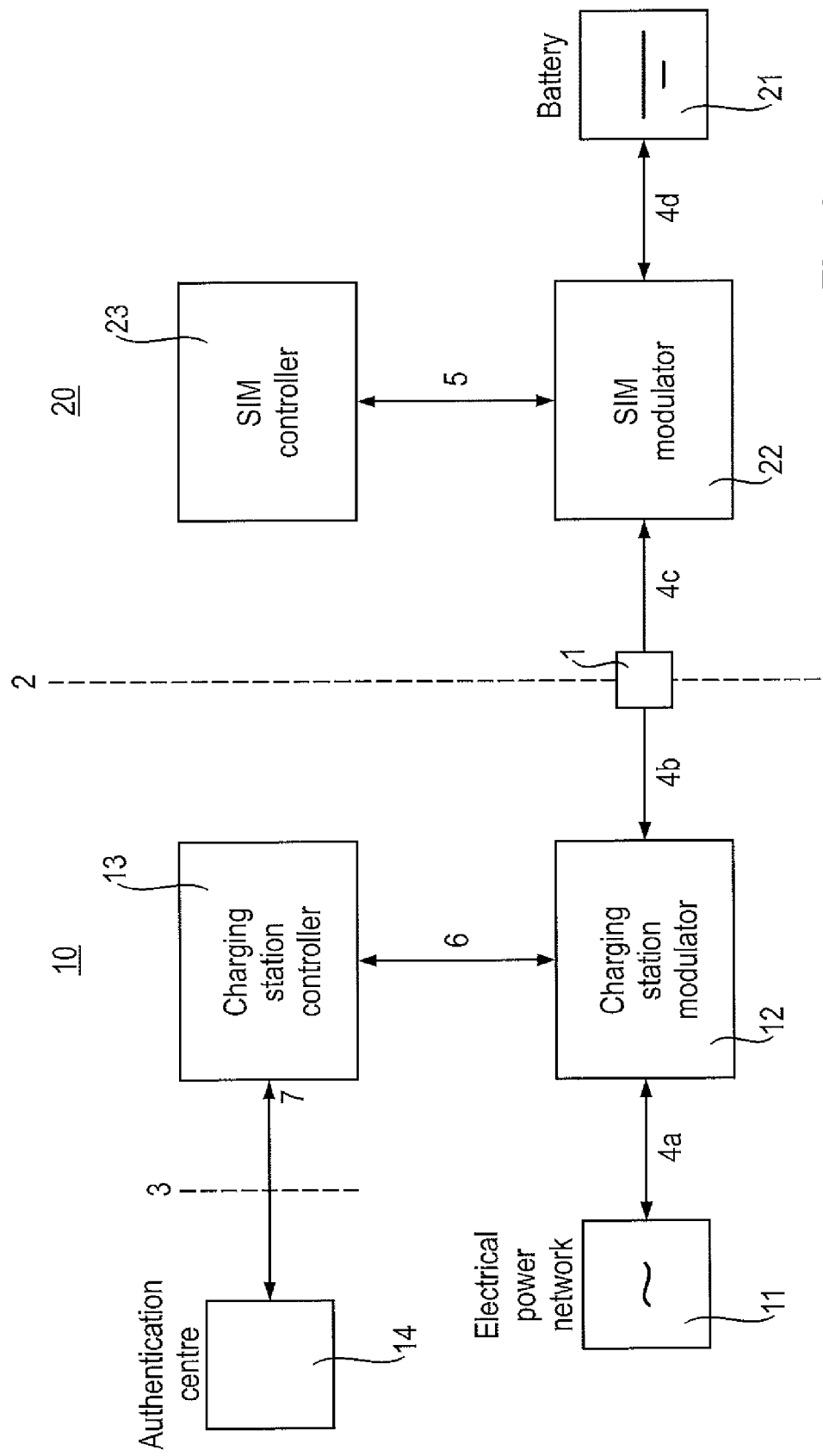
FIG. 1 A block diagram of a first embodiment of the invention.

FIG. 1 depicts a block diagram of a first embodiment of the invention. This embodiment covers a charging device for a rechargeable battery. Energy flow is possible in both directions, as has already been described. The arrows at the electrical power network 11 and at the battery 21 are therefore shown in both directions.

As the electrical socket 1 defines an interface, the shown components of the battery charging device are related to the interface line 2 drawn through the electrical socket 1.

To the left of the interface line 2 are the charging station 10 components with the charging station modulator 12, the charging station controller 13 and the authentication centre (AC) 14. Since the authentication centre 14 is usually responsible for a plurality of charging stations, the interface 3 is depicted additionally. The charging station 10 is linked to the electrical power network 11 via the cable 4a.

To the right of the interface line 2 are the SIM station 20 components with the SIM modulator 22 and the SIM controller 23. The SIM station 20 is linked to the battery 21 via the cable 4d.

The charging cable 4b, 4c links the charging station 10 to the SIM station 20. The energy flow between the electrical power network 11 and the battery 21 is therefore conducted via the cable components 4a, 4b, 4c, 4d, of which components 4b and 4c represent the actual charging cable on both sides of the electrical socket 1.

The energy connection can, in the simplest case, be established by inserting the charging cable 4c into the electrical socket 1. Additionally, it is also possible for the charging station modulator and/or the SIM modulator to contain circuit breakers, which are controlled by the charging station controller and/or the SIM controller.

The SIM controller 23 is linked to the SIM modulator 22 via the control line 5. The SIM controller 23 contains, in the same way as the mobile telephone in a GSM network, a SIM (Subscriber Identity Module) card, on which the SIM identifier is saved in an encoded manner.

On the other side, the charging station controller 13 is linked to the charging station modulator 12 via the control line 6. The charging station controller 13 takes on, in a corresponding manner, functions as those performed by a base station together with an authentication centre in a GSM network, in order to identify a registering network user. The charging station controller 13 is therefore linked to the authentication centre 14 via the interface 3 in a corresponding manner. The authentication centre 14 is a high-security region containing important data about all charging station controllers and SIM controllers in the network and contains, among other things, the SIM identifiers which uniquely identify each SIM card in the network. As the authentication centre 14 is usually in a control centre far away from the charging station 10, the interface 3 is a suitable for long distance transmission. The line 7 can therefore be, for example, an ISDN line, a GSM line or a DSL line.

The signal transmission path is formed overall by the control line 5, the charging cable 4b, 4c and the control line 6. The signal transmission path is coupled with the energy connection, in the present case with the charging cable, on sections 4b and 4c of the charging cable.

As soon as the signal transmission path between the charging station modulator 12 and the SIM modulator 22 has been established via the charging cable 4b, 4c, the SIM controller 23 transmits the SIM identifier. The SIM modulator 22 modulates the SIM identifier onto the charging cable 4b, 4c. Accordingly, the charging station modulator demodulates the SIM identifier and forwards the SIM identifier to the charging station controller 13. The transmission of the SIM identifier from the SIM controller 23 to the charging station controller 13 always occurs in an encoded form. This prevents the SIM identifier from being tapped by an unauthorised person on the signal transmission path, particularly on the path 4b and 4c of the charging cable, and thus prevents usage for unauthorised purposes.

As its first step, the charging station controller 13 verifies the SIM identifier using the authentication centre 14. If it is a user registered in the system, the charging station controller 13 activates the energy connection between the electrical power network 11 and the battery 21 via the circuit breaker and controls an energy quantity meter assigned to the SIM identifier. The measuring unit corresponding to the energy quantity meter can be located in any position on the line 4a, 4b, 4c, 4d between the electrical power network 11 and the battery 21, for example in the charging station modulator 12 or in the electrical socket 1. The counter of energy quantity meter, based on which the energy costs for the consumed energy quantity are calculated, is preferably located in the authentication centre 14 and is operated centrally there. If energy is supplied from the electrical power network 11 to the battery 21, the meter reading in the energy quantity meter is increased. If, however, energy is taken from the battery 21 and supplied in reverse to the electrical power network 11, the meter reading in the energy quantity meter is reduced.

The SIM controller 23 continuously sends the SIM identifier over short time intervals during the charging process. As soon as the charging station controller 13 no longer receives the SIM identifier, the control of the respective energy quantity meter is stopped. This can occur in its simplest form by removing the charging cable 4c from the electrical socket 1. It is, however, possible for the user to be linked to the SIM controller 23 by additional telecommunication means, such that he can influence the transmission of the SIM identifier. In the same way, it is possible for the user to control a circuit breaker in the SIM modulator 22 using the SIM controller 23, in order to cut off the energy supply. Finally, it is also possible for the user to send control signals from the SIM controller 23 to the charging station controller 13, which initiate a switching action in the charging station controller, so that the power supply is cut off via the circuit breaker located in the charging station modulator 12.

Figure 2:
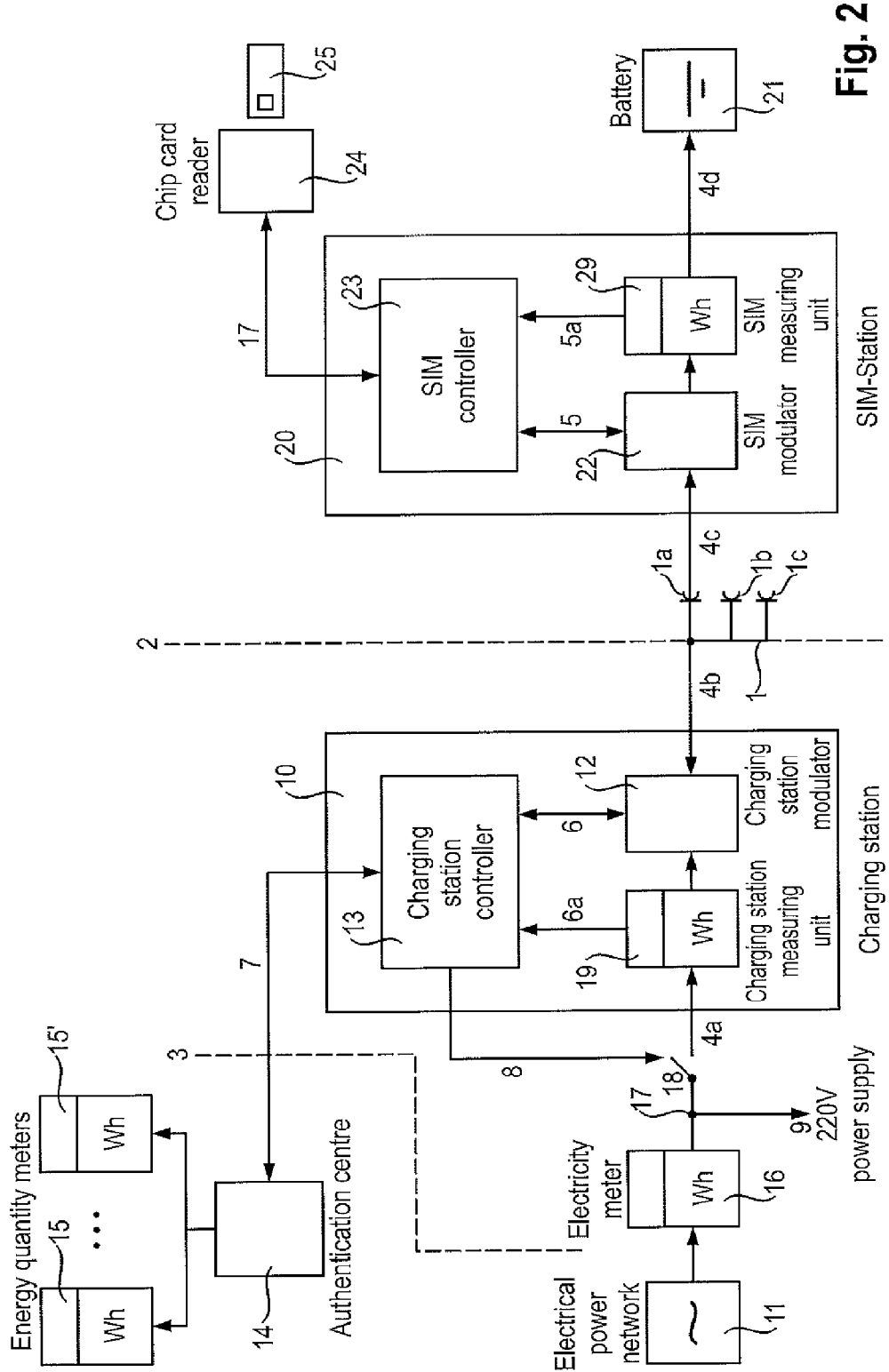
FIG. 2 A block diagram of a second embodiment of the invention.

FIG. 2 depicts a block diagram of a second embodiment of the invention. This embodiment also covers a charging device for a rechargeable battery. The second embodiment is basically identical to the first embodiment, such that the same components are also displayed with the same reference numbers. With the additionally drawn components, the charging device of the second embodiment can be used simultaneously by a plurality of consumers. Such a charging device can then be applied as a public electrical socket for the most different charging processes.

There is currently a need for public electrical sockets for charging rechargeable batteries. The problem with public electrical sockets is how to charge for the provided energy quantity. Public electrical sockets are available in libraries to be used by portable computers; these are usually free. The associated energy costs have to be borne by the library owner. The provision of public electrical sockets in car parks for electric vehicles has been so low up until now because the energy quantity used cannot be charged. For the quantities of energy used, it is no longer acceptable for a car park owner, in contrast to a library owner, for public electrical sockets to be made available for free, as in a library.

The second embodiment according to FIG. 2 represents a solution to this problem.

The electrical socket 1 should thus be a public electrical socket, which has been made available by a car park owner for charging the batteries of electric vehicles. The electrical socket 1 is thereby composed as a three-way adaptor with the individual electrical sockets 1a, 1b and 1c. Three electric cars can be attached simultaneously to the electrical socket 1. In FIG. 2, only a single attached electric vehicle is represented, wherein the components to the right of the interface line 2 are placed in the electric vehicle, that is the SIM station 20, the battery 21 and the chip card reader 24 with a chip card 25.

The components between the interface 2 and the interface line 3 are placed in the engineering room of the car park. The engineering room typically possesses a service connection to electrical power network 11, wherein energy use is charged using an electricity meter 16 in the normal way. The car park's 220V power supply is provided by the cable 9.

Based on these provisions, it is easily possible to change the setup of the components for the charging device according to the invention. To this end, a junction 17, a controllable circuit breaker 18 and the charging station 10 are provided behind the electricity meter 16. The charging station 10 may be located in a housing, which is of a comparable size to the housing of the standard electricity meter 16. The charging station 10 is linked to the circuit breaker 18 via the cable 4a on the electrical power network side and to the electrical socket 1 via the cable 4b on the electrical socket side.

The circuit breaker 18 is controlled by the charging station controller 13 via the control line 8. The circuit breaker 18 can thereby be integrated in the housing of the charging station 10.

To operate the charging station 10, the charging station 10 must only be attached further to the telecommunication line 7, wherein the telecommunication line 7 links the charging station 10 to the remote-lying authentication centre 14.

In the description of the first embodiment according to FIG. 1, the way in which the energy quantity, which is continuously added to the energy quantity meter assigned to the SIM identifier, is determined was often missed out. To that end, in the second embodiment according to FIG. 2, a charging station measuring unit 19 and a SIM measuring unit 29 are provided in the charging station 10 and in the SIM station 20, respectively.

The charging station measuring unit 19 and the SIM measuring unit 29 are each an integrating measuring device with a counter for measuring the electrical work or the energy quantity. Corresponding integrated circuits are available for these measuring devices. These circuits are connected externally to voltage divider shunts and transformers. Transformers are components which convert a current into a voltage proportional to it, such as a Hall effect sensor in alternating and/or direct currents or miniature transformers in purely alternating currents. The corresponding values for the current and the voltage provided are supplied in the circuit via analogue-to-digital converters to a processing unit for calculating the amount of power currently being used. The integrating counter adds up all calculated power values over time and thereby delivers a digital value for the energy quantity provided.

The energy quantity meters located in the authentication centre 14, to which the energy quantities are continuously added according to the SIM identifier, are represented as positions 15 and 15'. Since the digital values of each energy quantity have already been provided by the charging station controller 13, the energy quantity meters 15 and 15' are just counters with no additional measuring functions. The counters can, for example, be managed as digital accounts on a data processing unit by the authentication centre 14, wherein each consumer is charged monthly, similar to the process for mobile telephones in the GSM network.

On the vehicle side, the SIM station is linked to a chip card reader 24, to which a SIM card 25 can be applied, via the cable 17. The main object of the SIM card 25 is to authorise the SIM station 20 in the authentication centre 14. Additionally, provision can be made for the user to identify himself/herself on the SIM card 25 with his/her personal identification number (PIN). In addition to authorisation, the SIM card 25 can also be used for various other services, in particular for logging individual charging processes.

Different variants are provided for the embodiment of the chip card reader 24. One variant is where the chip card reader 24 is integrated in the housing of the SIM station 20, wherein the housing of the SIM station must not be larger than the housing of a simple three-way, 220V distributor.

Another variant is one where the mobile telephone of the relevant consumer is used alongside the existing mobile telephone SIM card for the SIM station. The connection 17 can thereby be embodied as being wired (e.g. USB) or alternatively wireless (e.g. GSM and/or W-LAN for longer distances or Bluetooth for shorter distances). The SIM Identifier is thereby transmitted via the connection 17 from the mobile telephone to the SIM controller 23 in an encrypted manner. In this variant, it Is possible for the pre-existing authentication centre of the GSM operator to also be used by the electrical power network operator, wherein the GSM operator manages the energy quantity meters 15 and 15' on behalf of the electrical power network operator. The consumer then receives, alongside his/her monthly mobile telephone bill, a bill integrated therein for his/her energy quantity use at public electrical sockets.

The charging station modulator 12 and the SIM modulator 22 are preferably based on the pre-existing technology of the Powerline Communication Bus (PLC BUS). The PLC BUS uses the alternating current voltage of the electrical power network as a carrier signal for the control data which are to be transmitted. The charging cable 4b, 4c can thereby be used for both bidirectional energy transfer and the bidirectional transmission of control signals.

Without loss of generality, the energy flow is described below in only one direction from the electrical power network 11 to the battery 21. All descriptions are also valid, however, accordingly for energy flow in the other direction, as illustrated above—i.e. from the battery 21 to the electrical power network 11.

Thus the arrows from the electrical power network 11 to the battery 21 are drawn one-way, since an energy flow is here only understood to be in one direction from the electrical power network 11 to the battery 21. Independently from this, however, the bidirectional control signals are always transmitted via the charging cable 4b, 4c between the charging station 10 and the SIM station 20. The arrows are thus shown to be in both directions in this section.

As soon as the signal transmission path between the SIM station 20 and the charging station 10 has been established by inserting the charging cable 4c into the electrical socket 1a, the SIM station 20 is first authenticated in the same way as described with reference to the first embodiment. Then the circuit breaker 18 is closed by the charging station 10 to establish the energy connection.

It is, however, at the same time, henceforth possible for the batteries of two additional electric vehicles to be connected to the electrical sockets 1b and 1c. In order to eliminate misuse, the measured energy quantities are compared in the charging station controller 13.

The energy quantity provided by the electrical power network 11 via the cable 4a is first measured by the charging station measuring unit 19 and relayed to the charging station controller via the line 6a.

The energy quantity used by each electric vehicle to charge their respective battery 21 is moreover measured by each SIM measuring unit 29 and relayed to the SIM controller 23 via the line 5a. Every time a SIM identifier is transmitted, the SIM controller 23 also transmits the value of the measured energy quantity since the previous transmission to the charging station controller 13. The measured energy quantities can thus continuously be compared in the charging station controller 13 to that end. As soon as a predefined deviation limit has been exceeded, the charging station controller 13 controls the circuit breaker 18 via the control line 8 and cuts off the power supply for all users connected to the public electrical socket 1. The charging station controller 13 and the charging station modulator 12 possess a power supply independent from circuit breaker 18. The charging station controller 13 repeatedly checks (for example using low energy test currents) hereafter whether the energy balance has been further breached. Only when the energy quantity balance has been rebalanced is the circuit breaker 18 once again closed by the charging station controller 13 for the transfer of large energy quantities.

The reason for exceeding the deviation limit can be a load attached to one of the electrical sockets 1a, 1b and 1c which could not be authenticated. In this case, a message is sent to the SIM controller of the residual loads which had already been authenticated by the system. This message can be forwarded to the relevant consumers in an appropriate manner, for example by sending an SMS to his/her mobile telephone. In addition, it is not unforeseeable for an alarm to be set off in situ at the public electrical socket in order to prevent unauthorised consumers from using the public electrical socket without inserting a SIM station or from disturbing the legal use of the public electrical socket.

Should the charging station controller 13 record deviations which are within the predefined deviation limit, the values of the individual loads are assigned proportionally in such a way that the measurements sent to the energy quantity meters 15, 15' are concurrent with the overall energy quantity measured by the charging station measuring unit 19.

Due to the provision of the public electrical socket 1, there are firstly higher energy costs for the car park owner; these are accounted by the electricity meter 16. For the reimbursement of these costs, the authentication centre 14 also manages an energy quantity meter for the charging station 10 within the energy quantity meters 15, 15', so that the electrical power network operator can produce a monthly bill for the car park owner. In order to give an incentive to the car park owner to install the public electrical sockets, the amount of reimbursement is more than the regular amount used. Corresponding discount systems similar to those in the installation of solar panels are also possible.

Figure 3:
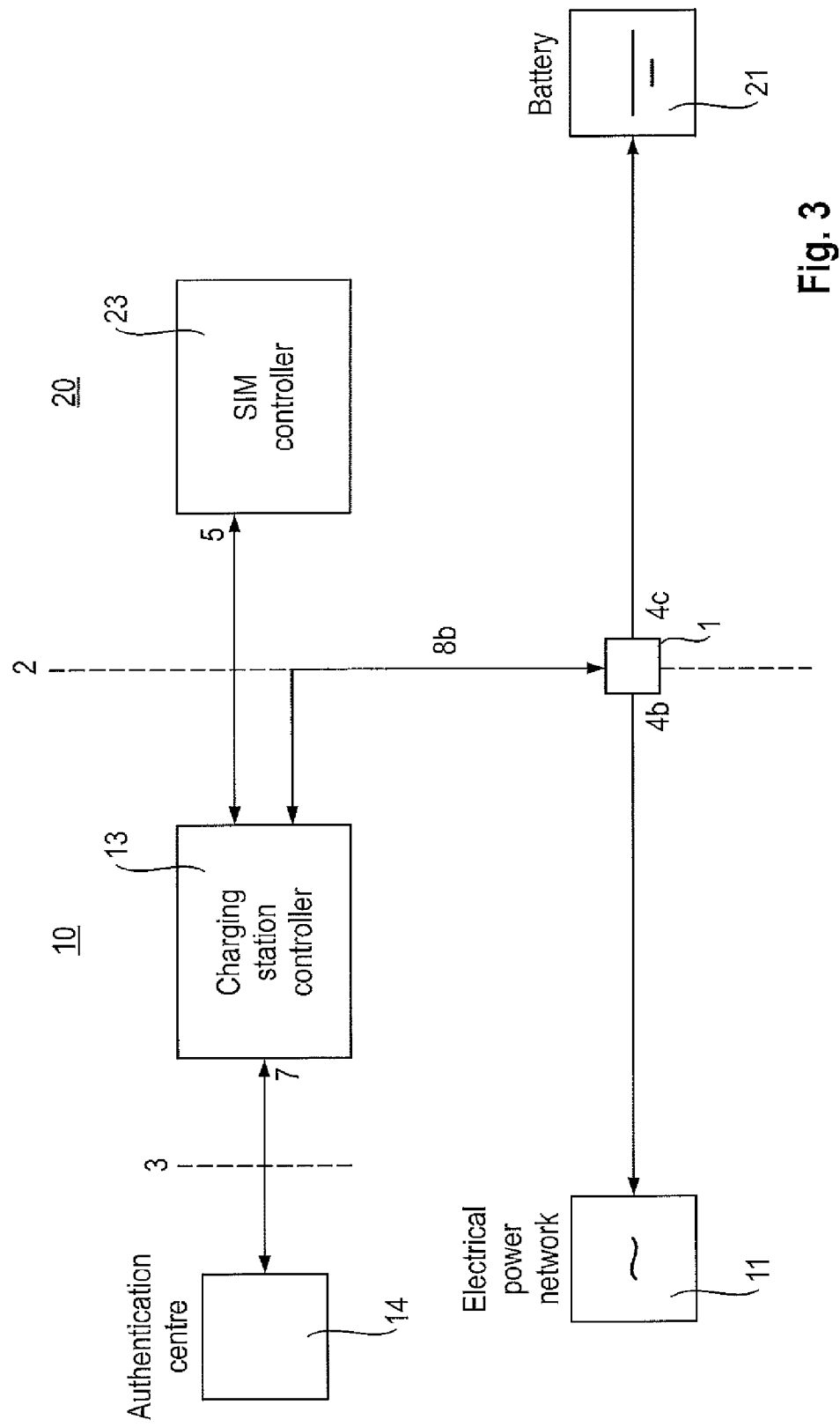
FIG. 3 A block diagram of a third embodiment of the invention.

FIG. 3 depicts a block diagram of a third embodiment of the invention. Just as the first and second embodiments, the third embodiment also covers a charging device for a rechargeable battery. The third embodiment is indeed a variant of the first and second embodiment, wherein control signals are transmitted in ways other than via the charging cable 4b, 4c.

A signal transmission path 5 separate from the charging cable 4b, 4c is provided for the transmission of control signals between the charging station controller 13 and the SIM controller 23. The signal transmission path 5 can thereby be embodied as being wired (e.g. USB) or alternatively wireless (e.g. GSM and/or W-LAN for longer distances or Bluetooth for shorter distances).

The measuring unit of the energy quantity meter and a circuit breaker are integrated in the electrical socket 1. The signals via the lines 6a and 8 described in FIG. 2 are now transmitted via the line 6b placed between the electrical socket 1 and the charging station controller 13.

All remaining modes of operation of the first and second embodiment can be transferred to the third embodiment. Alternatively, it is indeed possible in the third embodiment for the energy to be transferred wirelessly between the electrical power network 11 and the battery 21. Additional details regarding wireless energy transfer are described relative to the fourth embodiment.

Figure 4:
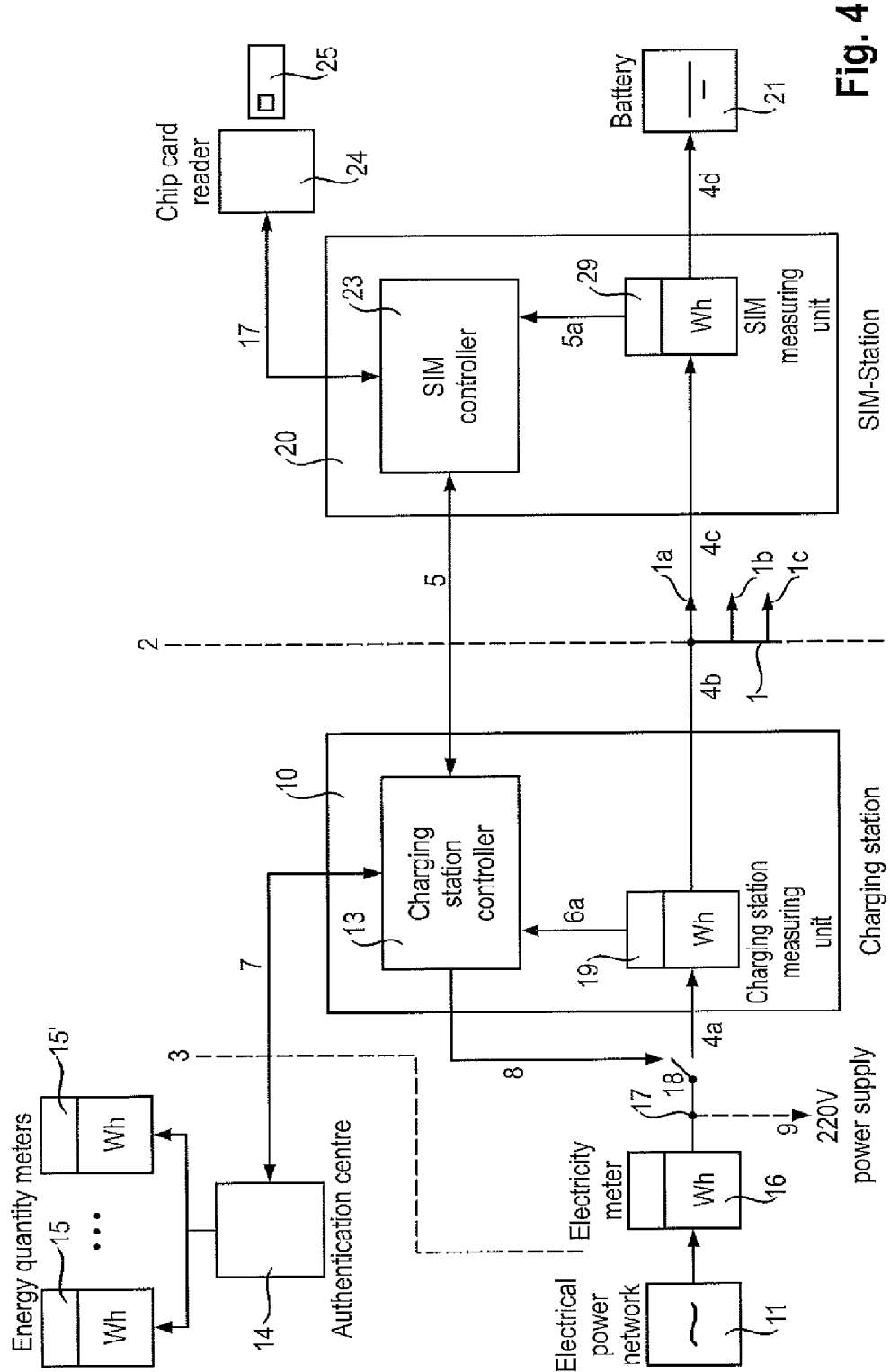
FIG. 4 A block diagram of a fourth embodiment of the invention.

FIG. 4 depicts a block diagram of a fourth embodiment of the invention. The fourth embodiment also covers a charging device for a rechargeable battery. As per the second embodiment, a charging station measuring unit is provided in the charging station 10 and a SIM measuring unit is provided in the SIM station 20. The fourth embodiment is different from the second embodiment, however, in that the control signals are transmitted in ways other than via the charging cable 4b, 4c. The control signals are thus no longer transmitted by the lines 5, 4c, 4b and 6, as shown in Figure, but are transmitted directly via the separate signal transmission path 5. The signal transmission path 5 can also be embodied as being wired (e.g. USB) or alternatively wireless (e.g. GSM and/or W-LAN for longer distances or Bluetooth for shorter distances).

All remaining modes of operation of the second embodiment can be transferred to the fourth embodiment. Alternatively, it is also possible in the fourth embodiment for the energy between the electrical power network 11 and the battery 21 to be transferred wirelessly. For wireless energy transfer, inductive principles are particularly considered. For example, a delivery point 1 can be located in a car park in the middle of a parking space, which comprises a primary coil embedded in the floor. A secondary coil is located on the chassis of the electric vehicle situated above it, which forwards the absorbed energy to the battery 21 via the SIM measuring unit 29. The energy connection 4c is thereby embodied wirelessly. The delivery point 1 can also cover a plurality of parking spaces, so that energy can be supplied simultaneously to a plurality of electric vehicles via the arrows 1a, 1b and 1c. The use of energy quantity is recorded, in the same way as has already been described in the second embodiment, via the SIM measuring units 29 located in the SIM stations. Every time a SIM identifier is transmitted, the energy quantity measured by the SIM measuring unit 29 is sent to the charging station controller 13. Once the SIM measurement has been received, the charging station controller 13 adds the energy quantity provided by the SIM station 23 to an energy quantity meter assigned to the SIM identifier. Improper energy discharge is prevented, as has already been described in the second embodiment, by a comparison of the energy quantity in the charging station controller 13, wherein the circuit breaker 18 is opened and the energy transfer via the delivery point 1 is cut off when there is a breach in the energy quantity balance.

Regarding wireless energy transfer, it is also possible for the signal transmission path to be coupled with the energy connection near the delivery point 1. The control signals are then transmitted wirelessly between the SIM controller 23 and the delivery point 1 by applying corresponding modulators and between the delivery point 1 and the charging station controller 13 via the charging cable 4b. Similar to the coupling described above between the signal transmission path and the charging cable, the advantage of the coupling is that it can be recognised when the electric vehicle departs from the delivery point by monitoring the signal transmission path. By monitoring the signal transmission path, the position of the electric vehicle and thereby the function of the energy connection can both be monitored near the delivery point 1.

Figure 5:
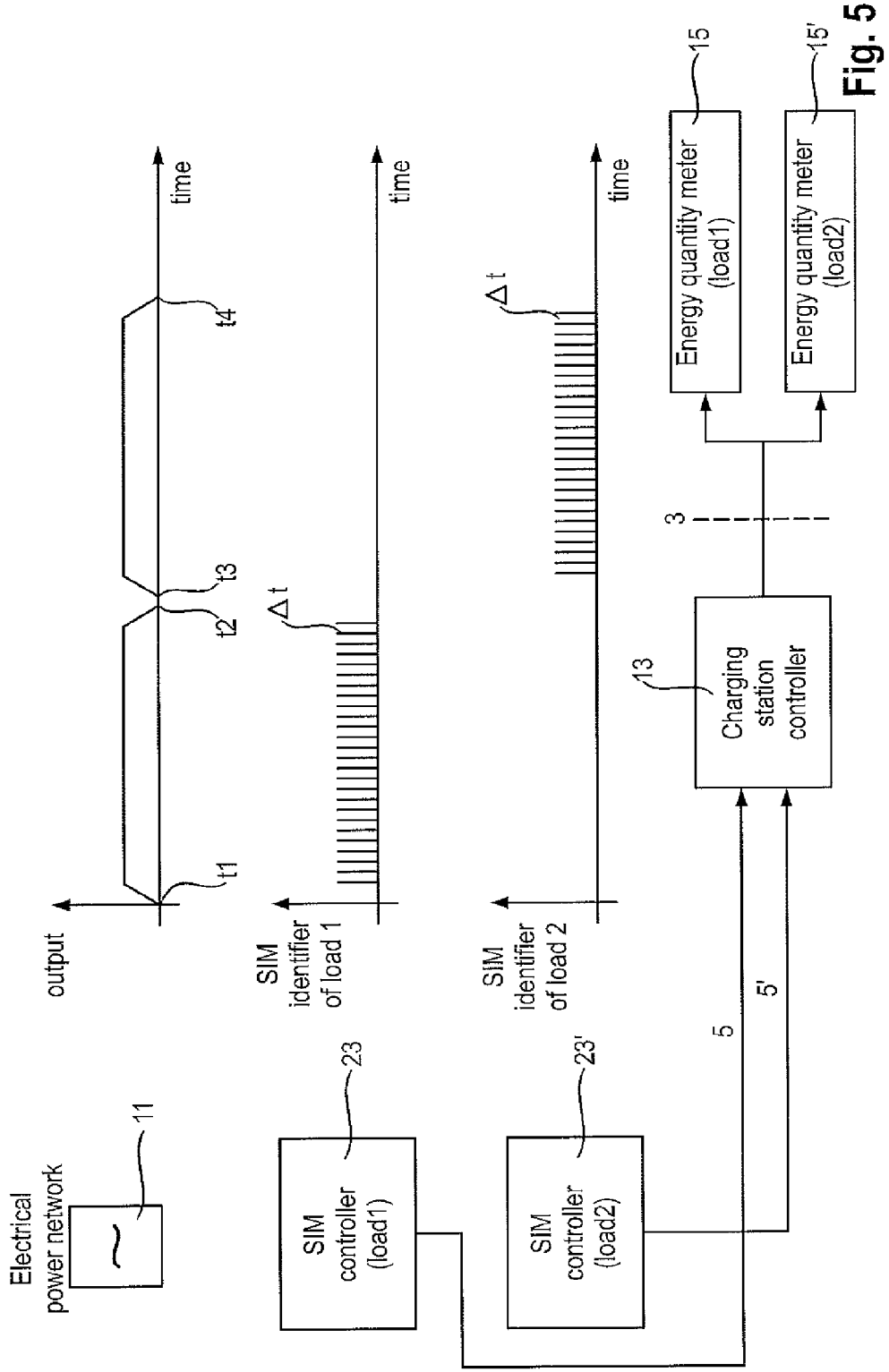
FIG. 5 The principal information flow between the SIM controller and the charging station controller during the sequential energy supply of a plurality of loads, FIG. 6 The principal information flow between the SIM controller and the charging station controller during the parallel energy supply of a plurality of loads, FIG. 7 A potential authentication protocol between the charging station controller and the SIM controller with subsequent data exchange, FIG. 8 A potential data protocol with pre-payment based on the basic principle of a digital signature, and FIG. 9 A potential data protocol with post-payment based on the basic principle of a digital signature.

FIG. 5 depicts the principle information flow between the SIM controller and the charging station controller in the sequential energy supply of a plurality of loads. These loads can be, for example, rechargeable batteries. First the load 1 is connected to a public electrical socket at a time $t_1$ and disconnected from the public electrical socket at a time $t_2$. The energy quantity is supplied by the electrical power network 11 in the time interval $t_2-t_1$, which corresponds to the surface under the trapezoidal line in the power/time diagram between the time points $t_1$ and $t_2$.

Firstly, the load 1 is authenticated directly after $t_1$. Then the SIM controller 23 of the load 1 sends, at set time intervals $\Delta t$, the SIM identifier assigned to the SIM station to the charging station controller 13 via the signal transmission path 5. Once a SIM identifier has been received, the charging station controller 13 adds the energy quantity provided to the load during the time interval $\Delta t$ to the energy quantity meter 15, wherein the energy quantity meter 15 is assigned to the SIM identifier of the load 1. The addition can be stored temporarily in the charging station controller 13. This temporary storage has the same effect as directly adding to an energy quantity meter assigned to a SIM identifier. After the energy transfer has been completed, the energy quantity which was initially stored temporarily and now already added together completely is added to the energy quantity meter 15 of the load 1 at the time $t_2$.

The time interval $\Delta t$ defines the resolution of the energy quantity meter 15. The resolution is understood to be the smallest perceptible change in the readout of the energy quantity on an energy quantity meter. If energy quantity meters 15, 15' are calibrated measuring devices, the resolution is usually specified due to statutory requirements, wherein the resolution with which it needs to comply can in turn be a function of the meter reading.

The time intervals $\Delta t$ are set by the charging device according to the invention in such a way that the energy quantity delivered in a time interval $\Delta t$ via the SIM station is less than a prescribed resolution of the energy quantity meter. The prescribed resolution thereby preferably corresponds to the resolution based on statutory requirements. On the other hand, it is not necessary to set the time interval $\Delta t$ significantly below the statutory requirement, since the computing capacities of the SIM controller 23, 23' and of the charging station controller 13 then become unnecessarily loaded and unnecessary costs arise due to the required additional computing capacities. It can therefore be assumed that with the customarily available computing capacities, time intervals $\Delta t$ can be achieved in a range of several tenths of seconds at reasonable costs. For optimisation purposes, it is also conceivable that the time intervals $\Delta t$ will not be regular, but rather variable from SIM identifier to SIM identifier and are adaptively calculated. It is also conceivable, that the amounts of energy measured in the time intervals $\Delta t$ are interpolated over time and/or filtered using suitable algorithms. In total thereby the interrelationships between the actual energy quantity consumed by the respective loads and the energy consumption obtained in charging station controller 13 will satisfy the regularities between an analogue measuring signal and the digital measured values supplied by an analogue-digital converter to a processor. The time intervals $\Delta t$ thereby correspond to the sampling rate of the analogue-digital converter. All the known physical laws of measurement technology for the handling of analogue to digital converted measured values are therefore applicable as appropriate with regard to the energy quantity values administered by the charging station controller, such as for example the anti-aliasing filtering, the dimensioning of the sampling rate and the prediction of future measured values.

At time $t_3$ the load 2 is connected to the public electrical socket and is disconnected from the public electrical socket at time $t_4$. The electrical power network 11 thus provides an energy quantity over the interval of time between $t_3$ and $t_4$, which corresponds to the area under the trapezoidal line in the power-time diagram between the points $t_3$ and $t_4$. The transfer of the SIM identifier from load 2 takes place via the signal transmission path 5'. The measured energy quantity is added up by the charging station controller 13 on the energy quantity meter 15'. Otherwise the function sequence is identical to that described for load 1.

Figure 6:
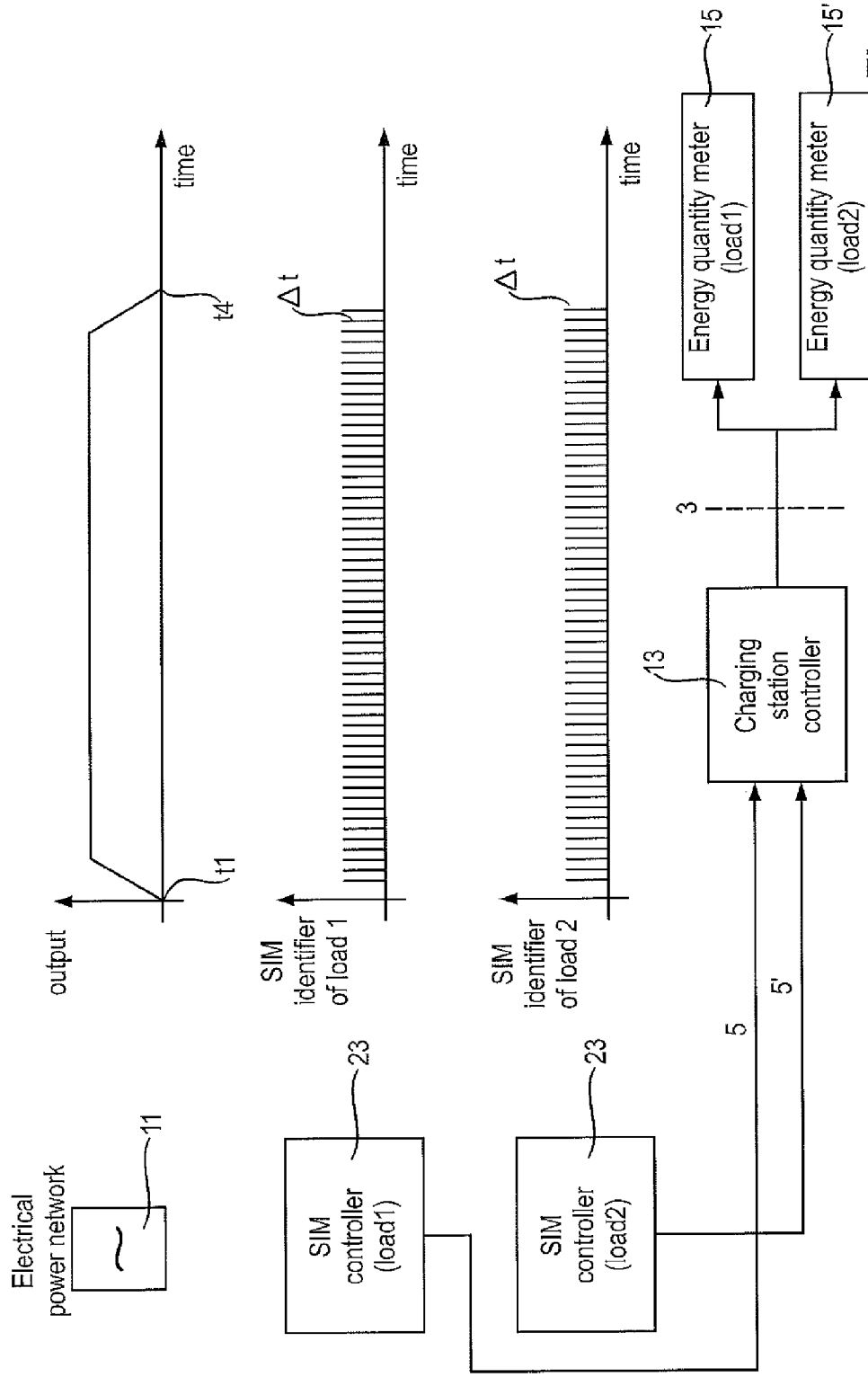

FIG. 6 shows the principle signal flow between the SIM controller and the charging station controller for the parallel supply of energy to a plurality of loads. The loads could be rechargeable batteries, for example. The difference from the signal flow represented in FIG. 5 is that at time $t_1$ the load 1 and the load 2 are simultaneously connected to the public electrical socket via a multiple outlet. Both loads are again separated from the public electrical socket at $t_4$. In the interval $t_4$-$t_1$ the energy quantity is provided from the power supply network 11, which corresponds to the area under the trapezoidal line of the power-time-diagram between the points $t_7$, and $t_4$. The power supply network 11 can make no distinction as to whether the energy quantity is delivered to load 1 or load 2. The distinction is made in that SIM measuring units are integrated in the SIM controllers 23 and 23' respectively—as is described in accordance with the second embodiment in FIG. 2. The measured values acquired by the SIM measuring units are transmitted to the charging station controller 13 together with the SIM identifiers via the signal transmission paths 5 and 5' and then correspondingly added by the charging station controller 13 on the energy quantity meters 15 and 15'. Otherwise the function sequence is identical to that already described with reference to FIG. 4.

The charging device according to the invention facilitates the realisation of other safety measures during the charging of rechargeable batteries on public electrical sockets.

An Important safety measure involves security against the forbidden removal of the charging cable during the charging process. This feature can be additionally activated by the user after the start of the charging process. Insofar as this involves the charging of the battery of an electric vehicle, the activation can be coupled to the locking of the electric vehicle and the deactivation with the unlocking of the electric vehicle. If the charging cable is removed while the electric vehicle is locked, then an alarm can be triggered as with a normal commercially available vehicle anti-theft device. In addition, or alternatively, an appropriate SMS message can be sent on the mobile telephone of the relevant consumer. It is also conceivable that the SIM controller could be blocked and only reactivated on the input of the PIN of the relevant consumer.

If the SIM identifiers are transmitted via the charging cable, then the removal of the charging cable can be immediately and reliably detected by the charging station controller, since the protocol for transmitting the SIM identifiers is interrupted in an inadmissible manner. If the SIM identifiers are transmitted by other means than the charging cable, then an additional unit must be provided along the charging cable, which detects the removal of the charging cable.

To optimise the charging process it is also advantageous for control signals to be exchanged between the SIM controller 23 and the charging station controller 13, which have an effect on the charging process itself, as is described, for example, in the document U.S. Pat. No. 5,049,802. The control of the charging state can also take place as a function of time, for example in order to take advantage of a favourable night time tariff. The charging state can also be communicated to the mobile phone of the relevant consumer.

Figure 7:
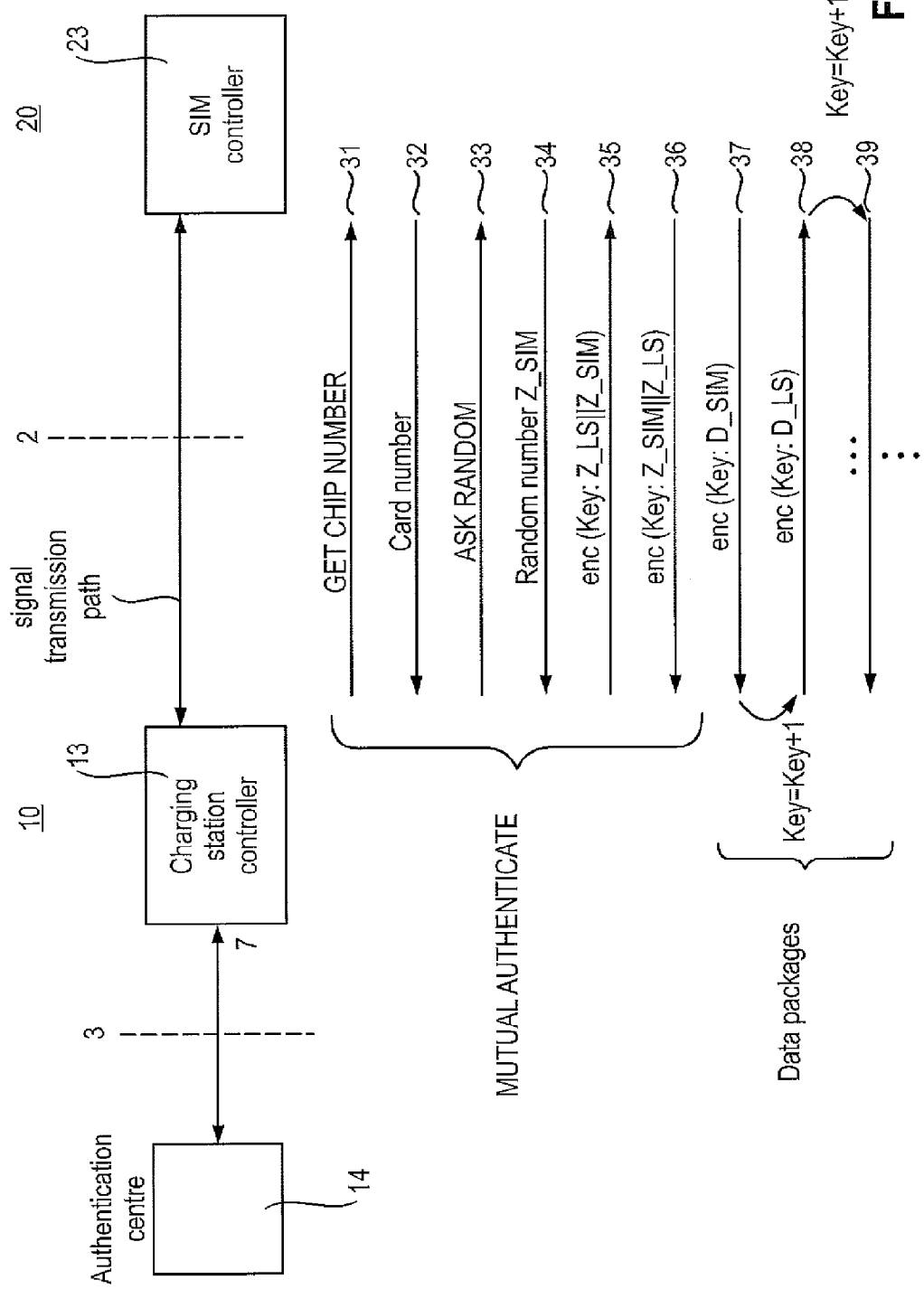

FIG. 7 shows a possible authentication profile between the charging station controller and the SIM controller with subsequent data exchange. The components shown are, similar to the embodiments of FIGS. 1-4, again related to a charging device for a rechargeable battery. Same components are again indicated with the same reference numerals.

A chip card is provided in the SIM controller 23 as a means of authentication. The purpose of the authentication is that both the charging station controller 13 and the SIM controller 23 are able to determine whether the respective other communication partner is actually a genuine communication partner. To this end both communication partners must have a common code, which is generated and checked with the help of the authentication process. This code is referred to here in the following as the key.

A key authentication is essentially more secure than a simple PIN verification. In PIN verification, the so-called PIN is merely sent to the chip card in clear text, so that it is simple for a hacker to intercept the PIN code. However, with key authentication it is not possible to determine the common key by interception of the signal transmission path.

The key authentication of devices is fundamentally known and is, for example, described in the series of standards ISO/IEC 9798. In view of the type of authentication, a distinction is mainly made between the respective algorithm used (e.g. symmetrical, asymmetrical) and the direction of transmission (uni-directional, bi-directional).

The protocol represented in FIG. 7 is based on the mutual symmetrical authentication with the so-called Challenge-Response method, as can be achieved through the command MUTUAL AUTHENTICATE in accordance with ISO/IEC 7816-8. In this procedure one communication partner presents the other with a question (challenge) generated randomly. The opposite partner calculates an answer with an algorithm and sends it back to the questioner (response). In the protocol according to FIG. 7, the challenge is first created by the charging station controller 13. The key of the whole signal transmission is calculated from the card number of the chip card and the main code, which is known to the charging station controller 13.

The described functionality of the authentication is described in the following from the view of the charging station 10 only with reference to the charging station controller 13. As already mentioned, however, in connection with the first example embodiment according to FIG. 1, the functionality can also be distributed in an appropriate manner on the charging station controller 13 and a further distant lying authentication centre 14.

First the card number of the SIM controller 23 is requested by the charging station controller 13 with the control signal 31 (command GET CHIP NUMBER).

After the charging station controller 13 has obtained the card number with the control signal 32, the charging station controller 13 then calculates the individual authentication code of the chip card by means of the main key in the charging station controller 13, which is then used as the key for the complete signal transmission.

With the control signal 33 the charging station controller 13 also requests from the SIM controller 23 a random number (command ASK RANDOM).

This random number Z_SIM is sent from the SIM controller 23 with the control signal 34 to the charging station controller 13. On receipt of the random number Z_SIM, the charging station controller 13 additionally generates the random number $Z_{13}$ LS.

In the next step the charging station controller 13 concatenates the random numbers Z_LS and Z_SIM, encodes them with the key and sends this block to the SIM controller 23 with the control signal 35. The SIM controller 23 can decode the received block and check whether the random number previously sent to the charging station controller 13 corresponds with the received one. If this is the case, the SIM controller 23 knows that the charging station controller 13 has the secret key. Hence the charging station controller 13 is authenticated with respect to the SIM controller 23.

In the last step of the authentication, the SIM controller interchanges the two random numbers, encodes them with the secret key and sends the result to the charge station controller 13 with the control signal 36. The charging station controller 13 decodes the received block and compares the random number previously sent to the SIM controller 23 with the one received. If this coincides with the one previously sent, then the SIM controller 23 is also authenticated with respect to the charging station controller 13. Hence the mutual authentication is then concluded.

After the authentication, data packages D_SIM and D_LS, which respectively are encoded with the secret key, can be exchanged between the charging station controller 13 and the SIM controller 23 on a safe basis like it is shown in FIG. 7 with the control signals 37, 38 and 39. In order to further increase security, it is also possible that the key can be changed again after each transmission of a control signal according to a specific scheme. For example the key can be incremented by 1 after every transmission, as shown in FIG. 7.

With regards to the SIM controller 23, mainly the SIM identifiers are transmitted according to the invention to the charging station controller 13. A specific number can, for example, be agreed as the SIM identifier. However, in general the type of SIM identifier is arbitrary, since each identifier encoded with the key represents a system-wide unique identifier and hence is suitable as a SIM identifier. The SIM identifier can accordingly also be variable. For example, it could be a specific meter reading, which is incremented by 1 after each transmission. What is decisive for the SIM identifier is solely that the charging station controller 13 detects the received, key-encoded identifier as the SIM identifier and thereupon adds the exchanged energy quantity or the energy quantity soon to be exchanged between the electrical power network and the consumer via the energy connection to an energy quantity meter assigned to the SIM identifier.

In the following the time-wise dimensioning of the data protocol represented in FIG. 7 is further explained on the basis of exemplary numerical values.

If one assumes that the data transfer takes place via a connected charging cable using the previously mentioned PLC technology, then cycle times in the region of several MHz can be achieved using this technology. Establishing the connection in the framework of the command MUTUAL AUTHENTICATE then has a duration depending on the installed computing power in the charging station controller 13 and in the SIM controller 23 of several seconds (e.g. 4 seconds). During this delay time, non-authenticated consumers can also essentially be connected to the charging station controller 13 and acquire minimal amounts of energy until the charging station controller 13 has detected the missing authorization and blocks the energy supply via a corresponding switch. This minimal loss is normally tolerated by the system. However, it is conceivable that upon a repeated unauthorised use, the charging station controller permanently blocks the energy supply and reports the unauthorised use to the authentication centre 14.

After the authentication has taken place, in a further step the time intervals Δt between the SIM identifiers must be set, according to the invention, in such a way that in a time interval Δt, the energy quantity exchanged or to be exchanged between the charging station 10 and the SIM station 20 via the energy connection lies below a prescribed resolution of the energy quantity meter.

In the following, the dimensioning of the time intervals $\Delta t$ is explained on the basis of a charging process of an electric vehicle. A small 2-door electrically-powered car with a power of 30 kW is taken as a basis. The battery capacity be 16 kWh. On the part of the charging station controller a normal domestic plug socket with 220V/16A is made available. For a complete full-charging of the vehicle battery using this domestic connector, a period of 8 hours is required. If to simplify matters it is assumed that the exchange of energy is equally distributed over the charging period, then the vehicle battery is charged with a constant power of 2 kW. An energy quantity $E_{hour}$ of 2 kWh is thus exchanged for the charging of the vehicle battery.

The required resolution of the energy quantity meter $\Delta E_{max}$ be 0.5 Wh. If one assumes a price for a Kilowatt-hour of 25 Cents, then this corresponds to a price resolution of 0.0125 Cents. So that for the maximum interval $\Delta t_{max}$:

$$\Delta t_{max} = \frac{\Delta E_{max}}{E_{hour}} \cdot 3600 \text{ seconds} = 0.9 \text{ s}$$

If the charging station controller 13 continuously determines the energy quantity $E_{hour}$, then it is also optionally possible to continuously adapt and optimise $\Delta t_{max}$. This optimisation is also possible for other consumers, which are connected in addition to a pre-existing load.

If one assumes here, for example, that a notebook is now connected to the distributor connector 1 represented in FIG. 2 alongside the electric vehicle, then it is clearly possible to control the charging process of the notebook battery in parallel with another value of $\Delta t_{max}$.

The capacity of the notebook battery be 80 Wh. For complete full-charging, one hour is required. If the energy exchange is also equally distributed over time once again, then the charging process takes place with a constant power of 80 W. Thus for the charging of the battery, an energy quantity $E_{hour}$ of 80 Wh is exchanged. With a required resolution of the energy quantity meter $\Delta E_{max}$ of again 0.5 Wh, then the following applies for the maximum separation in time $\Delta t_{max}$:

$$\Delta t_{max} = \frac{\Delta E_{max}}{E_{hour}} \cdot 3600 \text{ seconds} = 22.5 \text{ s}$$

If, on the other hand, when charging the notebook battery, one uses the calculated value of $\Delta t = 0.9$ s for the electric vehicle, superfluous computing capacities would be provided.

The resolution prescribed with reference to the energy quantity meter can depend just as much on statutory stipulations as on the specific application case. It is also conceivable that first the price resolution is given and that the resolution of the energy quantity meter is determined from that. For example, one can demand 1 Cent as a price resolution. If one also assumes here a price for the kilowatt-hour of 25 Cents, then the required resolution of the energy quantity meter $\Delta E_{max}$ would have to be at least 40 Wh. This would considerably increase time intervals $\Delta t_{max}$ calculated above.

For the charging of the vehicle battery, an energy quantity $E_{hour}$ of 2 kWh or 2000 Wh is exchanged. Thus the following formula is valid for the maximum time interval $\Delta t_{max}$ when charging the vehicle battery:

$$\Delta t_{max} = \frac{\Delta E_{max}}{E_{hour}} \cdot 3600 \text{ seconds} = 72 \text{ s}$$

With the notebook accumulator, on the other hand, the charging process takes place with an energy quantity $E_{hour}$ of 80 Wh. Thus the following applies when charging the notebook battery for the maximum time interval $\Delta t_{max}$:

$$\Delta t_{max} = \frac{\Delta E_{max}}{E_{hour}} \cdot 3600 \text{ seconds} = 1800 \text{ s} = 30 \text{ mins}$$

Between the receipt of two SIM identifiers, the time interval $\Delta t$ on charging the notebook battery can take up to 30 minutes, in order to achieve a price resolution of 1 Cent.

When a SIM identifier has been received, an energy quantity exchanged or to be exchanged is added to an energy quantity meter assigned to the SIM identifier. If the energy quantity which has been delivered before the receipt of the current SIM identifier and after the previous SIM identifier is added up, then this is refered to as post-payment. If, on the other hand, it is the energy quantity which will presumably be delivered after the receipt of the SIM identifier up to the next SIM identifier, then this is refered to as pre-payment.

When the time intervals $\Delta t$ are selected in such a way that the price resolution is clearly less than 1 Cent, then hardly any differences can be established between the post-payment and the pre-payment. If, on the other hand, the time intervals $\Delta t$ are selected in such a way that the price resolution exceeds 1 Cent, then the operator of the power supply network is increasingly interested in a pre-payment, while the user will increasingly prefer a post-payment.

Both variants can, however, be designed acceptable and advantageous both for the operator and for the user independent of the selection of the time intervals $\Delta t$, when the data exchange on the signal transmission path is carried out in accordance with the basic principle of the digital signature.

A digital signature is a cryptographic method wherein a number is calculated according to a message or to specific data. With the digital signature it is thereby possible, that the authorship and the affiliation of the data can be securely verified, even when the data themselves are transmitted in an unencrypted form. The storing and the usage of the secret signature code typically takes place on the part of the user with a chip card. For this chip card, also described as a signature card, the international standards ISO/IEC 7816-4 and ISO/IEC 7816-8 are applicable. For the authentication method between the signature card and the outer environment the standard ISO/IEC 14888 also applies. Furthermore, in general it is usual that a digital signature is transmitted in accordance with the X.509 ITU-T-standard.

Figure 8:
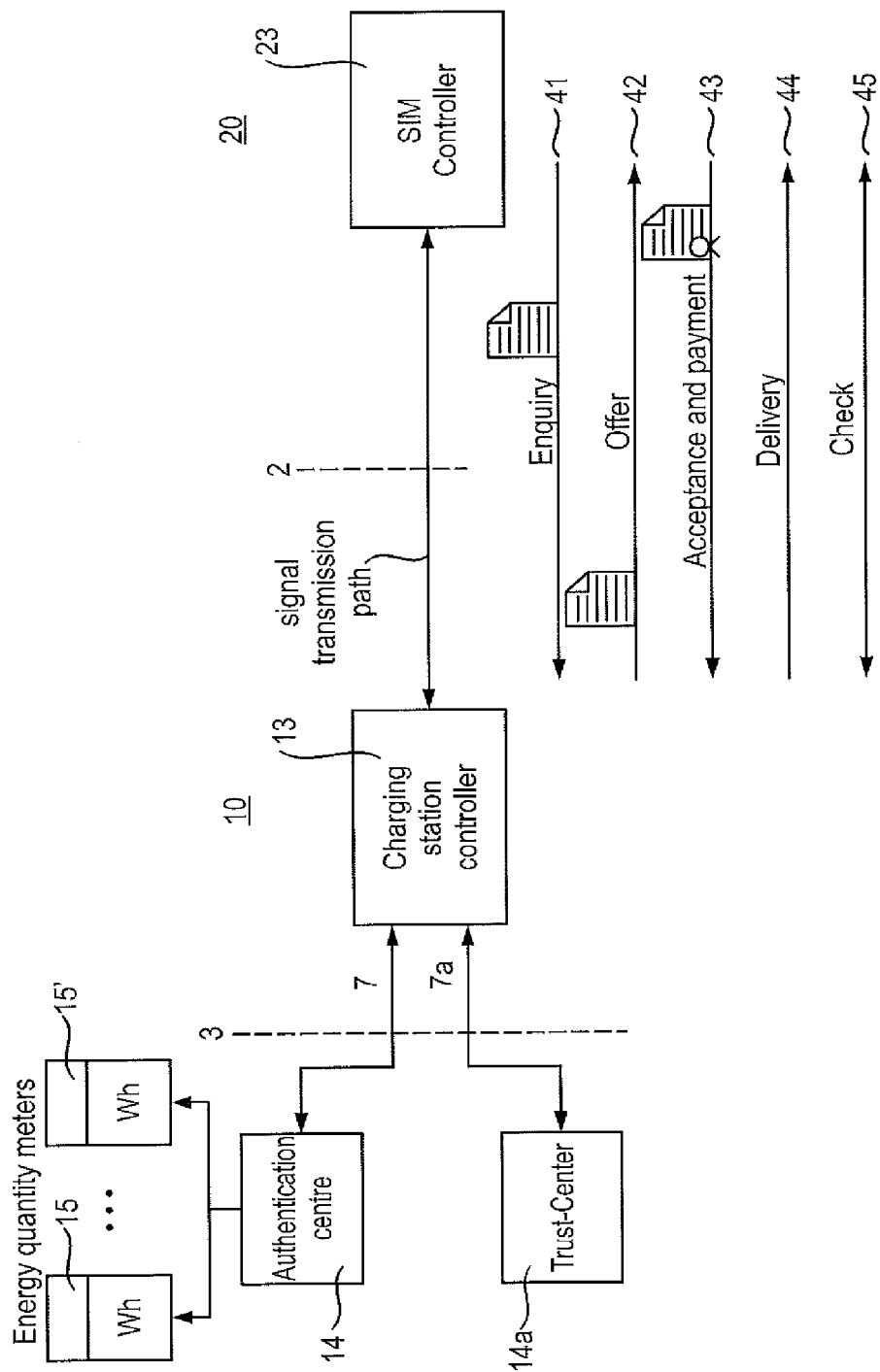

FIG. 8 shows a possible data protocol with prepayment according to the basic principle of the digital signature. The represented components cover a charging device for a rechargeable battery in similar fashion to that shown in the embodiments of FIGS. 1-4, Same components are therefore again identified with the same reference numerals.

The method of the digital signature is subject to statutory framework conditions. Many signature laws (e.g. the German law relating to signatures) demand the operation of an independent certification centre, which must be approved by the relevant authorities. This certification centre is referred to as a Trust-Centre 14a in FIG. 8.

For establishing the data protocol, the signal transmission path between the charging station controller 13 and the SIM controller 23 must first be physically set up. This takes place in the manner as was described in FIGS. 1-4, with a transmission via the charging cable, for example by plugging in the charging cable.

Then, for further establishing of the data protocol, steps 1-4 described in the following are carried out, with the aim of validating the so-called certificates of the charging station controller 13 and of the SIM controller 23. The valid certificates confirm that the other respective communication partner is a genuine communication partner. Moreover, the validated certificates are required in order to verify the later exchanged digital signatures.

Steps 1-4 are not further represented in FIG. 8 and run in particular as follows:

1. Session enquiry of the SIM controller 23 to the charging station controller 13.

In this step the general admissibility for establishing a data protocol is examined. The request of the SIM-controller thereby for example contains the following information:

Identifier of the desired authentication centre 14, i.e. the desired operator of a power supply network.

Energy quantity, which in total is likely to be required

Period of time, in which the energy quantity is to be delivered.

2. Forwarding of the session enquiry from the charging station controller 13 to the authentication centre 14.

The charging station controller 13 first supplements the session enquiry with further information on his sphere of influence (such as the number of already connected SIM controllers and the energy quantity currently delivered to these SIM controllers) and forwards the session enquiry to the desired authentication centre 14. In response, the charging station controller 13 obtains the confirmation for the general admissibility of establishing a data protocol (or in exceptional cases the rejection, e.g. should the electrical power network be overloaded) from the authentication centre 14.

3. Validation of the certificate of the charging station controller 13.

The charging station controller 13 sends its certificate to the SIM controller 23. The SIM controller 23 validates the certificate of the charging station controller 13 with a test request, which is sent to the charging station controller 13 via the signal transmission path and onward via the line 7a to the Trust-Centre 14a. The test result is transmitted back from the Trust-Centre 14a to the SIM controller 23.

4. Validation of the certificate of the SIM Controller 23.

The SIM controller 23 sends its certificate to the charging station controller 13. The charging station controller 13 validates the certificate of the SIM controller 23 with a test request, which is sent via the line 7a to the Trust-Centre 14a. The test result is transmitted back from the Trust-Centre 14a to the charging station controller 13.

If both certificates are valid, then the data protocol between the charging station controller 13 and the SIM controller 23 is established.

The now-commencing controlled exchange of energy with pre-payment runs cyclically and begins with an enquiry 41 from the SIM controller 23 to the charging station controller 13. The enquiry contains the desired energy quantity within the time interval Δt. The enquiry 41 is passed on from the charging station controller 13 via line 7 to the authentication centre 14.

When the enquiry 41 has been confirmed by the authentication centre 14, the charging station controller 13 sends a corresponding offer 42 to the SIM controller 23. If, on the other hand, the enquiry 41 from the authentication centre 14 can only be confirmed with limitations, then the offer 42 sent to the SIM controller 23 from the charging station controller 13 is modified accordingly. In any case the offer Is associated with a unique offer number, so that the whole order process can be uniquely identified system-wide. By this means, the offer number can be generated in accordance with the so-called GUID-Standard (Globally Unique Identifier).

It is conceivable that the steps 41 and 42 can be repeated many times, until the SIM controller finally receives an acceptable offer 42.

The SIM controller 23 then provides a digital signature 43 on the received offer 42 and thereby generates an acceptance with payment. The digital signature 43 received by the charging station controller 13 here has the function of the SIM identifier according to the invention. Thus, according to the invention, the charging station controller 13 forwards the digital signature 43 via the line 7 to the authentication centre 14. The digital signal 43 is then verified in the authentication centre 14. Then the quantity of energy to be exchanged in accordance with offer 42 is added up on an energy quantity meter 15, which is assigned to the digital signature 43—i.e. the SIM identifier according to the invention.

The authentication centre 14 confirms the booked energy quantity via the line 7 to the charging station controller 13, whereupon the charging station controller 13 carries out the delivery 44 of the agreed energy quantity in the agreed time Δt.

As far as the SIM controller 23 also has an energy quantity meter, as has been described on the basis of FIG. 2 and FIG. 4, a check takes place in step 45, in fact at a time parallel to the delivery 44. To this end, the charging station controller 13 requests from the SIM controller 23 the current meter reading of the SIM measuring unit 29 and compares this meter reading with that of the charging station measuring unit 19. If the ascertained difference exceeds a prescribed value then a complete or partial reversal of the excess payment can take place on the basis of the system-wide unique offer number. Excess deliveries, on the other hand, are always booked at the expense of the operator of the electrical power network and can lead to switch-off by triggering of the circuit breaker 18.

After the check 45 has taken place or even parallel in time to this, steps 41-45 recommence from the start with a new enquiry 41 by the SIM controller 23. Before the current delivery 44 is completed, a confirmation for the next delivery is thus already at the charging station controller 13, so that the next delivery can commence in a seamless sequence as soon as the current delivery 44 has been completed.

In the event of faults in the overall sequence, the charging station controller 13 is equipped with a switch-off option, as described on the basis of FIG. 2 and FIG. 4, through activation of the circuit breaker 18. Possible causes for such a switch-off can be:

- The SIM controller 23 does not respond to the request of the charging station controller 13 for reading out the meter reading, e.g. due to a disconnection of the signal transmission path.
- The meter readings of the charging station measuring unit 19 and of the SIM measuring unit 29 differ too much from one another.
- The SIM controller 23 does not respond to the offer 42 of the charging station controller 13.
- The digital signature 43 of the SIM controller 23 is invalid.

As soon as the SIM controller 23 finally displays in an enquiry 41 or in a digitally signed rejection of an offer 42, that the delivery of the desired energy quantity is concluded, the charging station controller 13 introduces an orderly disconnection of the data protocol.

Figure 9:
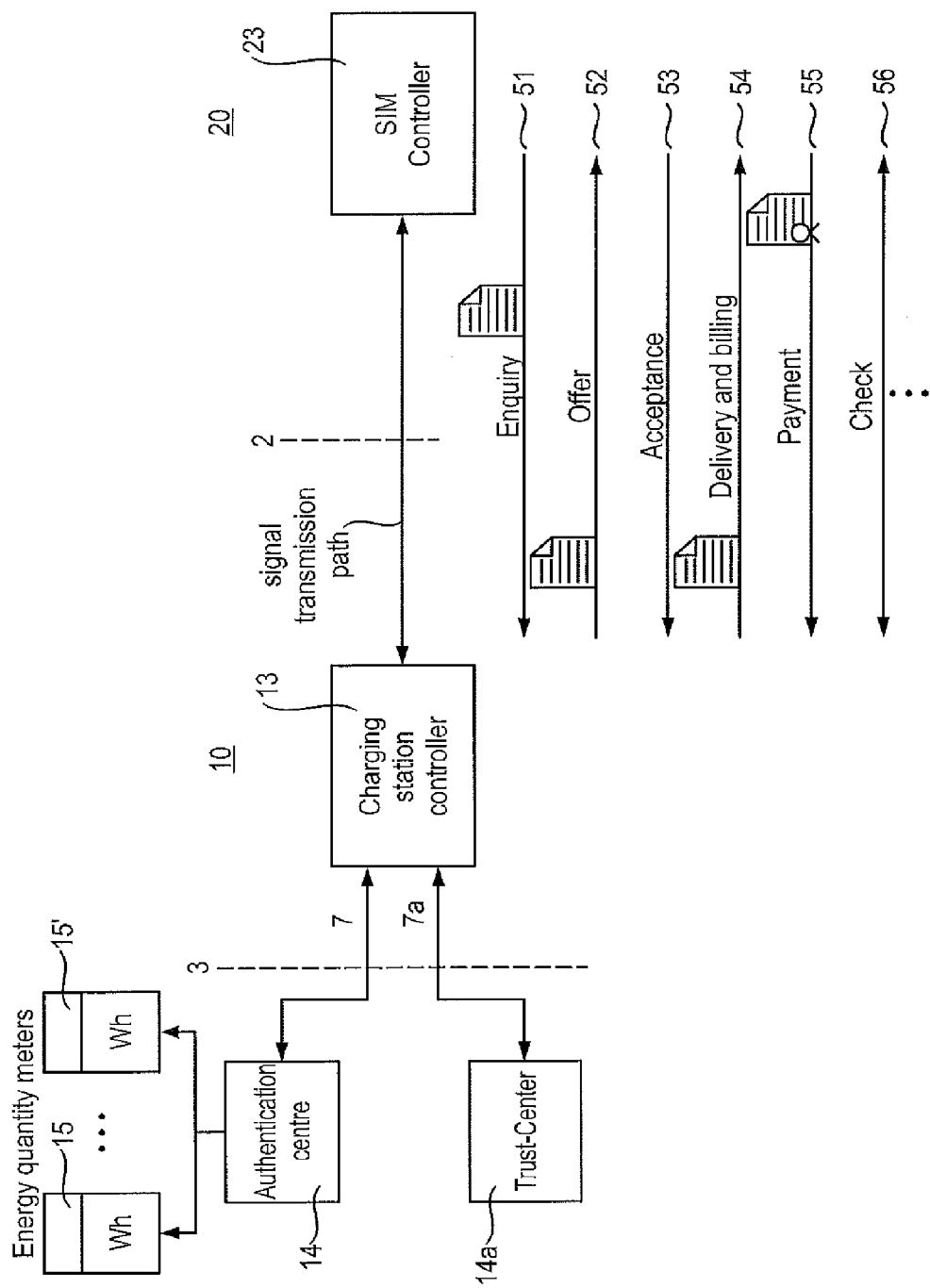

FIG. 9 shows a possible data protocol with a post-payment in accordance with the basic principle of the digital signature. The components represented relate to a charging device for a rechargeable battery in similar fashion to in the forms shown in the embodiments of FIGS. 1 to 4. Same components are therefore indicated using the same reference numerals.

The steps for establishing and for disconnecting of the data protocol described on the basis of FIG. 8 apply in the same way for FIG. 9. The sole difference in the data protocol in FIG. 9 compared with that in FIG. 8 is the sequence of the steps 51 to 56 for the execution of a post-payment.

Here, the steps also run in a cyclic sequence beginning with an enquiry 51 from the SIM controller 23 to the charging station controller 13. The enquiry contains the desired energy quantity within the time interval Δt. The enquiry 51 is forwarded from the charging station controller 13 via line 7 to the authentication centre 14.

When the enquiry 51 is confirmed by the authentication centre 14, the charging station controller 13 sends a corresponding offer 52 to the SIM controller 23. If, on the other hand, the enquiry 51 can only be confirmed in a limited form by the authentication centre 14, then the offer 52 sent to the SIM controller 23 Is modified accordingly by the charging station controller 13. In any event, the offer is linked to a unique offer number, so that the complete order process can be uniquely identified system-wide. The offer number can, for example, be generated according to the so-called GUID Standard (globally unique identifier).

It is conceivable that the steps 51 and 52 are repeated many times, until the SIM controller finally receives an acceptable offer 52.

The SIM-controller 23 then sends the confirmation 53 to the charging station controller 13 to confirm the offer 52, whereupon the charging station controller 13 carries out the delivery 54 of the agreed energy quantity in the agreed time Δt and sends an invoice to the SIM controller 23.

The SIM controller 23 then provides a digital signature 55 on the received invoice and thereby generates the SIM identifier for the payment. The digital signature 55 received by the charging station controller 13 thus has the function of the SIM identifier according to the invention. The charging station controller 13 then passes on the digital signature 55 according to the invention via the line 7 to the authentication centre 14. In the authentication centre 14 the digital signature 55 is verified and then the energy quantity delivered according to the offer 52 is added on to an energy quantity meter 15, which is assigned to the digital signature 55—hence to the SIM identifier according to the invention.

As far as the SIM controller 23 also has an energy quantity meter, as has been described on the basis of FIG. 2 and FIG. 4, a check takes place in step 56, in fact in parallel with the delivery 54. For this purpose, the charging station controller 13 demands from the SIM controller 23 the current meter reading of the SIM measuring unit 29 from the SIM controller and compares this meter reading with the meter reading of the charging station measuring unit 19. If the ascertained difference exceeds a prescribed amount, a full or partial reversal of the excess payment can take place on the basis of the unique system-wide offer number. On the other hand, excess deliveries are always booked at the expense of the operator of the electrical power network and can lead to switch-off by activation of the circuit breaker 18.

After the check 56 has taken place or even in parallel in time with it, the steps 51-56 recommence with a new enquiry 51 by the SIM controller 23. Before the current delivery 54 is completed, a confirmation of the next delivery is thus already present at the charging station controller 13, so that the next delivery can commence seamlessly, as soon as the current delivery 54 is complete.

For the steps described on the basis of FIG. 8 and FIG. 9 for the pre-payment and post-payment, various versions are conceivable. For example, it is possible that the enquiry 41 and the enquiry 51 are only executed once at the start of the whole data protocol, so that within the time intervals Δt the offers 42 and 52 are begun with.

In the pre-payment in accordance with FIG. 8, the enquiry 41 and the offer 42 within the time intervals Δt could even be completely dispensed with. In spite of this, it is immediately started with an order and a payment 43, so that the delivery 44 then takes place.

In the post-payment in accordance with FIG. 9 the steps of offer 52 and confirmation 53 can be skipped. It is also conceivable that a delivery and an invoice 54 could be commenced directly, and then the payment 55 takes place.

The advantages of the basic principle of the digital signature according to FIG. 8 and FIG. 9 compared to the authentication protocol in accordance with FIG. 7 are first of all that the information transmitted on the signal transmission path does not have to be encoded, since this information (i.e. energy quantity, delivery time, etc.) is, as a rule, not confidential. The decisive factor is merely that the authenticity of the information on the part of the charging station controller 13 and on the part of the SIM controller 23 can be reliably verified, which, according to the basic principle of the digital signature, is possible more effectively than key authentication. Computing capacity can be saved by this means.

The sequence of payments and deliveries in accordance with the basic principle of the digital signature also enables the time intervals Δt and hence also the measuring accuracy of the energy quantity meters can be increased compared to the key authentication, since with ascertained discrepancies an effective reimbursement of the over-payment is possible. The prescribed resolution and hence also the time intervals Δt can. In principle be increased to the extent permitted by the increasing expense of the necessary reverse transactions as a consequence of ascertained deviations between the charging station measuring unit 19 and the SIM measuring unit 29. In addition to the necessary reverse transaction, the losses for the electrical power network operator must be included in the calculation, which arise when unauthorised consumers are connected to a charging station 10 and within the time interval Δt can obtain in the first instance a certain energy quantity before the lack of authorisation is ascertained by the charging station 10 and the switch-off can take place via the circuit breaker 18.

The sequence of payments and deliveries in accordance with the basic principle of the digital signature also has the advantage that all the functions of a smart grid can be realised in a simple manner, as is described, for example, in US 2008/0281663 A1. In particular, it is possible that delays in deliveries on the part of the operator of the electrical power network can be negotiated upon start of the data protocol. Information on the type and scope of delays in deliveries tolerated by the user can, for example, be included in the initial SIM controller 23 enquiries, so that the actual delivery can take place with optimum avoidance of peak loads in the electrical power network. The user can be compensated by the operator of the electrical power network for resulting delays by means of special favourable tariffs, such that as a consequence, in accordance with the principle of the smart grid, a delivery of this type leads to a minimisation of the end price that the user has to pay for the delivery.

The invention claimed is:

1. Device for controlled exchange of energy between an electrical power network and a load, comprising:
    a stationary charging station for establishing an energy connection between the electrical power network and a delivery point,
    a charging controller for sending and receiving control signals via a signal transmission path, and
    a SIM station installed on the load side for establishing an energy connection between the load and the aforementioned delivery point, wherein the SIM station comprises a SIM measuring unit for measuring an energy quantity, which is exchanged via the energy connection, passing through the SIM station and a SIM controller for sending and receiving control signals via the signal transmission path, wherein:
    the SIM controller sends a SIM identifier assigned to the SIM station to the charging controller at set time intervals via the signal transmission path,
    the charging controller, on receiving a SIM identifier, adds the energy quantity exchanged between the electrical power network and the load via the energy connection on an energy quantity meter assigned to the SIM identifier, and
    the time intervals are set in such a way that the energy quantity exchanged or to be exchanged between the electrical power network and the load via the energy connection within a time interval lies below a predefined resolution of the energy quantity meter.

2. Device according to claim 1, wherein the charging station comprises a charging station measuring unit for measuring the energy quantity which is exchanged via the energy connection passing through the charging station.

3. Device according to claim 1, wherein the control signals sent by the SIM station to the charging station comprise the measurements taken by the SIM measuring unit.

4. Device according to claim 3, wherein the charging station comprises a controllable circuit breaker, which is inserted between the electrical power network and the delivery point.

5. Device according to claim 4, wherein the charging station controller breaks the energy connection between the electrical power network and the delivery point by controlling the circuit breaker, when the measurements taken by the charging station measuring unit exceed a pre-defined deviation limit compared to the measurements taken by the SIM measuring unit and sent by the SIM controller.

6. Device according to claim 1, wherein the load is a rechargeable battery.

7. Device according to claim 6, wherein the delivery point is an electrical socket, to which a charging cable is attached on the load side for establishing the energy connection to the battery.

8. Device according to claim 7, wherein the signal transmission path near the electrical socket is coupled with the charging cable.

9. Method for exchanging electrical energy between an electrical power network and a load,
    wherein an energy connection is established between the electrical power network and a delivery point by a stationary charging station, a charging controller is provided for sending and receiving control signals via a signal transmission path, and
    wherein an energy connection is established between the load and the aforementioned delivery point via a SIM station installed on the load side, wherein the SIM station comprises a SIM measuring unit and a SIM controller for sending and receiving control signals via the signal transmission path, the method comprising:
    measuring, by the SIM measuring unit, an energy quantity which is exchanged via the energy connection gassing through the charging station,
    sending by the SIM controller a SIM identifier assigned to the SIM station to the charging controller at set time intervals via the signal transmission path and a value representing the measured energy quantity,
    adding by the charging controller, on receiving a SIM identifier, the energy quantity exchanged between the electrical power network and the load via the energy connection on an energy quantity meter assigned to the SIM identifier, and
    wherein the time intervals are set in such a way that the energy quantity exchanged between the electrical power network and the load via the energy connection within a time interval lies below a predefined resolution of the energy quantity meter.

10. SIM station for controlled exchange of energy between an electrical power network and a load, wherein the SIM station is suitable for establishing an energy connection between the load and a delivery point on the electrical power network side, comprising:
    a SIM measuring unit for measuring the energy quantity which is exchanged via the energy connection passing through the SIM station; and
    a SIM controller for sending and receiving control signals via a signal transmission path, wherein:
    the SIM controller is configured to send a SIM identifier assigned to the SIM station in set time intervals via the signal transmission path for the control of an energy quantity meter assigned to the SIM identifier, and
    the time intervals are set in such a way that the energy quantity exchanged or to be exchanged between the electrical power network and the load via the energy connection within a time interval lies below a predefined resolution of the energy quantity meter.

11. A charging system for controlled exchange of energy between an electrical power network and a load comprising:
    a stationary charging station, wherein the charging station is suitable for establishing an energy connection between the electrical power network and a delivery point on the load side, and
    a charging controller for sending and receiving control signals via a signal transmission path, wherein
    the control signals received via the signal transmission path comprise energy measurements taken by a SIM measuring unit of a SIM station and a SIM identifier of the SIM station which is assigned to the load and which is incorporated in the control signals at set time intervals, the charging controller, on receiving a SIM identifier, adds the energy measurements representing energy exchanged between the electrical power network and the load via the energy connection on an energy quantity meter assigned to the SIM identifier, and
    the time intervals are set in such a way that the energy quantity exchanged or to be exchanged between the electrical power network and the load via the energy connection within a time interval lies below a predefined resolution of the energy quantity meter.

* * * * *